United States Patent
Apitz

(10) Patent No.: US 11,365,147 B2
(45) Date of Patent: Jun. 21, 2022

(54) OPTICAL COMPONENT, PREFERABLY WITH IMPROVED DEGRADATION RESISTANCE, AND METHOD FOR PRODUCING SAME

(71) Applicant: SCHOTT AG, Mainz (DE)

(72) Inventor: Dirk Apitz, Lausanne (CH)

(73) Assignee: SCHOTT AG, Mainz (DE)

(*) Notice: Subject to any disclaimer, the term of this patent is extended or adjusted under 35 U.S.C. 154(b) by 304 days.

(21) Appl. No.: 15/964,566

(22) Filed: Apr. 27, 2018

(65) Prior Publication Data
US 2018/0312426 A1   Nov. 1, 2018

(30) Foreign Application Priority Data

Apr. 27, 2017 (DE) .......................... 102017109076.2
Apr. 27, 2017 (DE) .......................... 102017109077.0

(51) Int. Cl.
| | |
|---|---|
| B32B 15/04 | (2006.01) |
| B32B 17/06 | (2006.01) |
| C03C 3/17 | (2006.01) |
| G02B 5/28 | (2006.01) |
| G02B 5/22 | (2006.01) |
| C03C 3/19 | (2006.01) |
| C03C 17/34 | (2006.01) |
| C03C 17/245 | (2006.01) |

(52) U.S. Cl.
CPC .................. *C03C 3/17* (2013.01); *C03C 3/19* (2013.01); *C03C 17/245* (2013.01); *C03C 17/3417* (2013.01); *G02B 5/226* (2013.01); *G02B 5/28* (2013.01); *C03C 2217/213* (2013.01); *C03C 2217/214* (2013.01); *C03C 2217/218* (2013.01)

(58) Field of Classification Search
CPC ....................................................... G02B 5/28
USPC ........................................ 428/426, 428, 432
See application file for complete search history.

(56) References Cited

U.S. PATENT DOCUMENTS

| | | | |
|---|---|---|---|
| 4,929,387 A | 5/1990 | Hayden | |
| 5,032,315 A | 7/1991 | Hayden | |
| 5,173,456 A | 12/1992 | Hayden | |
| 5,526,369 A | 6/1996 | Hayden | |
| 2012/0165178 A1 | 6/2012 | Ritter | |
| 2013/0344343 A1 | 12/2013 | Schreder | |
| 2014/0141534 A1* | 5/2014 | Phatak | B01J 19/0046 438/763 |

(Continued)

FOREIGN PATENT DOCUMENTS

| | | |
|---|---|---|
| CN | 103984044 | 8/2014 |
| DE | 102006062480 | 7/2008 |

(Continued)

OTHER PUBLICATIONS

JP2014208577 English machine translation.*

(Continued)

*Primary Examiner* — Lauren R Colgan
(74) *Attorney, Agent, or Firm* — Ohlandt, Greeley, Ruggiero & Perle, L.L.P.

(57) ABSTRACT

An optical component with improved degradation resistance is provided. The optical component includes an optical material and a coating. The optical material has a native surface that is susceptible to degradation processes. The coating is a layer of an inorganic material and is applied so as to be substantially contiguous so that there are no continuous paths between fluid surrounding the optical component and the optical material.

17 Claims, 4 Drawing Sheets

(56) References Cited

U.S. PATENT DOCUMENTS

| | | | |
|---|---|---|---|
| 2017/0217828 A1 | | 8/2017 | George |
| 2017/0315276 A1 | | 11/2017 | Dasbach |
| 2018/0294162 A1* | | 10/2018 | Xie .................... C23C 14/3471 |

FOREIGN PATENT DOCUMENTS

| | | |
|---|---|---|
| DE | 102011056873 | 6/2012 |
| DE | 102012210552 | 12/2013 |
| DE | 102015102496 | 4/2016 |
| EP | 1714948 | 10/2006 |
| JP | 10212134 * | 8/1998 |
| JP | 2014208577 * | 11/2014 |
| WO | 9408373 | 4/1994 |
| WO | 2015030015 | 3/2015 |

OTHER PUBLICATIONS

JP10212134 Japanese Abstract.*
Tech Brief: A Look at Atomic Layer Deposition (ALD), May 15, 2017.*
Meyer, "$Al_2O_3/ZrO_2$ Nanolaminates as Ultrahigh Gas-Diffusion Barriers—A Strategy for Reliable Encapsulation of Organic Electronics", Advanced Materials, 2009, vol. 21, pp. 1845-1849.
Meyer, "The origin of low water vapor transmission rates through $Al_2O_3/ZrO_2$ nanolaminate gas-diffusion barriers grown by atomic layer deposition", Applied Physics Letters 96, 243308, 2010, 4 pages.
Carcia, "Ca test of $Al_2O_3$ gas diffusion barriers grown by atomic layer deposition on polymers", Applied Physics Letters 89, 031915, 2006, 4 pages.
ISO 10110-7, "Optics and photonics—Preparation of drawings for optical elements and systems", Third Edition, Aug. 2017, 20 pages.
Kumar et al.; Fabrication of Al2O3/SiO2 multilayer reflective filters with excellent uniformity for demanding optical interference filters; Materials Research Express, vol. 6, Issue: 6, pp. 066410; Mar. 20, 2019.
Ness et al.; Thermal robustness of ion beam sputtered TiO2/SiO2, TiO2/Al2O3 and Al2O3/SiO2 IR anti-reflective coatings on YAG and sapphire substrates; Proceedings of SPIE—The International Society for Optical Engineering, vol. 7504, Issue: 1, pp. 1-7; Oct. 7, 2009.
Wuu et al.; Properties of double-layer Al2O3/TiO2 antireflection coatings by liquid phase deposition; Thin Solid Films, vol. 584, pp. 248-252; Jun. 1, 2015.
Besling et al.; Continuity and morphology of TaN barriers deposited by Atomic Layer Deposition and comparison with physical vapor deposition; Microelectronic Engineering, vol. 76, Issue: 1, pp. 60-69; Oct. 2004.

* cited by examiner

OPTICAL COMPONENT, PREFERABLY WITH IMPROVED DEGRADATION RESISTANCE, AND METHOD FOR PRODUCING SAME

CROSS REFERENCE TO RELATED APPLICATIONS

This application claims benefit under 35 USC 119(a) of German Patent Application 10 2017 109 077.0 filed Apr. 27, 2017 and German Patent Application 10 2017 109 076.2 filed Apr. 27, 2017, the entire contents of both which are incorporated herein by reference.

BACKGROUND

1. Field of the Invention

The invention generally relates to optical components, optical components referring in particular to those components which include materials that interact with electromagnetic radiation, preferably selectively, for example so that electromagnetic radiation is generated according to predetermined specifications, or so that electromagnetic radiation is filtered, for example so that only a specific preferred portion of the electromagnetic radiation is transmitted through the filter, or so that electromagnetic radiation is altered, for example in terms of its propagation direction, intensity, and/or in terms of its distribution, e.g. in terms of its spatial distribution, for example by focusing or defocusing. More particularly, the invention relates to optical components which exhibit improved resistance against degradation as caused by chemical reactions and/or physical processes which degrade the optical or mechanical properties of an optical material and/or an optical component.

2. Description of Related Art

Undesirable reactions which degrade the optical properties of a material include, for example, dissolution of a material by solvation and/or formation of corrosion crusts. For example, it has been known that under certain conditions the surface of an inherently inert material, such as $SiO_2$ or a highly resistant glass, such as so-called type I glasses, can degrade by the attack of water. This phenomenon, known as glass corrosion, presents itself as a combination of dissolution and transformation reactions, so it has to be understood as a combination of chemical reactions and physical processes, such as precipitation or dissolution processes. The surface of the so attacked material becomes dull and blotchy, so that certain optical properties, such as specular reflection (i.e. reflection with only a low proportion of scattered light, e.g. less than 10 ppm), or specular transmission (i.e. light transmission with only a low proportion of scattered light, e.g. less than 10 ppm) are impaired at this surface. Therefore, if such a material is extensively used under certain conditions, for example under high humidity and/or high temperature, special protective measures must be taken.

This is all the more so when not considering materials that have been developed and optimized for their chemical inertness, such as the type I glasses mentioned above, but rather glasses that have been optimized for certain other properties, here their optical properties. By way of example and not limitation, optical properties of a material include reflectance and transmission properties of a material, its refractive index, and dispersion, filtering properties, and non-linear processes, such as, e.g., the property of generating laser radiation. Such materials may have particularly desirable special optical properties, but only limited chemical and/or physical resistance.

For example glasses which include phosphates are susceptible to degradation, inter alia. Such glasses exhibit only limited resistance, for example to water. As a result, such glasses are attacked when employed under normal room air, by the moisture contained in the air. Over time, the surfaces of such glasses are therefore becoming blotched and cloudy, due to a dissolution of certain constituents of the glass by the humidity of the air and by formation of decomposition products, such as phosphoric acid, and accumulation of less soluble substances on the surface.

Therefore, it has also been known for a number of years to protect such susceptible surfaces against degradation by suitable protective measures.

For example, certain phosphate-based filter glasses are provided with coatings which are intended to protect the surfaces from degradation and moreover perform other functions, such as to have a reflection-reducing or reflection-enhancing effect.

For example, coating solutions exist for polished surfaces of phosphate-containing glasses. On the one hand, it is possible in the design of the coating to select a material sequence or a process parameter sequence in which pinholes or microcracks that are always occurring randomly do not further propagate at layer interfaces, due to certain different material properties of the layer materials or properties of layer growth, and thus do not continue across the entire coating.

Furthermore, coating technologies can be chosen in which the formation of pinholes is largely suppressed, or layers are produced with high compressive stresses, so that cracks do not form anymore.

In this context, the so-called ALD layers should be mentioned, for example, i.e. layers which are produced as thin layers by atomic layer deposition (ALD, for short). These ALD layers may exhibit specific limited barrier effects. The method is based on CVD technology and is described, for example, in the publication P. F. Carcia et al.: "Ca test of $Al_2O_3$ gas diffusion barriers grown by atomic layer deposition on polymers", in: Applied Physics Letters 89, 031915 (2006), American Institute of Physics, 2006. Other publications describe so-called "nanolaminates", i.e. very thin layers in a thickness range of, e.g., 2 to 10 nm, such as J. Meyer, et al.: "$Al_2O_3$/$ZrO_2$ Nanolaminates as Ultrahigh Gas-Diffusion Barriers—A Strategy for Reliable Encapsulation of Organic Electronics", in: Advanced Mater. 2009, 21 1845-1849, Wiley-VCH publishing house Weinheim, 2009, or J. Meyer: "The origin of low water vapor transmission rates through $Al_2O_3$/$ZrO_2$ nanolaminate gas-diffusion barriers grown by atomic layer deposition", in: Applied Physics Letters 96, 243308 (2010), American Institute of Physics, 2010.

However, drawbacks hereof are that for particularly demanding operation environments, such as, for example, under a particularly high temperature (70° C. or more), increased humidity, or other reactive conditions, the prior art layers are usually not sufficient to ensure permanent degradation stability of the optical components. However, even if protective layers of special quality are provided, degradation may still occur at the interfaces of the layers, such as, for example, tarnishing of a surface from a lateral side, or detachment of the coating from a lateral side (e.g. in the case of laser rods made of phosphate glass).

For example, investigations of ALD layers on phosphate glasses have shown that in environmental resistance tests at elevated temperature such as 85° C. and at increased relative humidity such as 85% rh, these layers exhibit severe signs of degradation as soon as after significantly less than 250 hours, and thus lose their effect.

In summary, therefore, the following problems may arise when using optical materials of low degradation resistance and/or optical components comprising such optical materials.

Polished surfaces are degrading. For example, surface roughness increases and/or light scattering becomes stronger. Furthermore, for example in the case of glasses which comprise phosphates, the surface may become blotchy. This is because glass constituents of low solubility remain on the surface of the glass.

Furthermore, material loss may occur. For example, as a result of dissolution processes, the optical material may decompose. Under extreme conditions, this may lead to a complete decomposition of the material. However, even an only partial erosion of material dramatically reduces the performance of the optical component based on such a material. For example, even in the case of only partial material erosion, the optical function may already not be sufficient anymore, or the optical material loses its mechanical stability, for example in the form of a lens that is cracking.

If the material is already provided as a composite in the sense that at least a portion of the surface of the optical material is at least partially covered with a layer, degradation processes may cause cracking or flaking of the coating. This is in particular the case with layers which are not completely dense so as to prevent degrading fluid substances, for example gases such as H2S or atmospheric moisture, from penetrating through the coating to the surface of the optical material. Due to degradation processes occurring at the interface between the optical material and the coating, such as swelling reactions or a generation of secondary products, a change in volume of the optical material and hence of the substrate is caused, with the result that the bonding of the layer is impaired and the coating is cracking or chipping off.

Thus, there is a need for optical components, in particular components exhibiting improved resistance to degradation.

In particular for high-quality optical components which can often comprise phosphate glasses, suitable coatings are sought which have a significantly better resistance to degradation and thus exhibit long-term stability that can be verified in an environmental resistance test, and which resist in such a test over significantly more than 250 hours, preferably more than 500 hours, and most preferably more than 1000 hours and beyond, even under climatic test conditions at an elevated temperature of 85° C. and an increased relative humidity of 85% rh. Components that resist this standardized environmental resistance test typically degrade so slowly in their applications that they survive the service life of the application.

SUMMARY

It is an object of the invention to provide optical components which preferably exhibit improved resistance to degradation. Another aspect of the invention relates to a method for producing optical components, preferably optical components with improved degradation resistance.

In the context of the present invention, the following definitions apply.

Optical Materials. In the context of the present invention, "optical materials" are understood to mean materials that interact, preferably selectively, with electromagnetic radiation, such an interaction occurring in a form so that electromagnetic radiation is generated according to predetermined specifications, or so that electromagnetic radiation is filtered, for example so that only a specific preferred portion of the electromagnetic radiation is transmitted through the filter, e.g. a preferred spectral or polarized portion, or so that electromagnetic radiation is altered, for example in terms of its propagation direction, intensity, and/or in terms of its distribution, e.g. in terms of its spatial distribution, for example by focusing or defocusing. An interaction within the meaning of the present invention may also include that a particularly high transmittance of electromagnetic radiation can be achieved and/or is achieved by the optical material. For example, such an interaction may include refraction or diffraction of electromagnetic radiation, for example in a specific range of wavelengths, an only selective transmission of electromagnetic radiation in a specific range of wavelengths, reflection of electromagnetic radiation, for example the reflection of visible light at a "specular" surface, splitting of a beam into different intensities with respect to the polarized components, such as in the generation of circularly or linearly polarized light, or generation of high-energy homogeneous radiation, such as in the form of laser radiation.

For the purposes of the present invention, the term optical activity is understood to be synonymous with the concept of the preferably selective interaction of a material with electromagnetic radiation.

For the purposes of the present invention, the term laser-active or optically laser-active component means that such a component causes amplification and/or generation of a laser beam.

An optically active surface or an optical surface is in particular a surface through which electromagnetic radiation enters into or exits from an optical material. A lateral surface is a surface of a body or of a shaped body from which preferably no light exits from the optical material. However, this surface may optionally also be relevant for the preferably selective interaction with electromagnetic radiation.

In this sense, optical materials for instance refer to those materials which are processed into optical components (for example lenses, prisms, windows, filters, laser rods, mirrors, beam splitters).

Optical materials include in particular the following.

Inorganic non-metallic materials. Here, the term inorganic non-metallic material includes amorphous, semi-crystalline, and/or crystalline materials, and/or mixtures thereof, such as glass ceramics, for example. The crystalline materials may be polycrystalline, for example in the form of a ceramic, as well as monocrystalline. Examples of crystalline materials are $Al_2O_3$, or yttrium-aluminum-garnet, or $CaF_2$, or LiF, or spinel. Examples of amorphous materials are glasses, for example phosphate glasses. All inorganic non-metallic materials may be given in pure or non-doped form, or in doped form.

Organic materials. Organic materials preferably include polymers, for example synthetic materials such as polycarbonate, polymethacrylate, polymethylmethacrylate, or cyclo-olefin copolymers (COC).

If the optical material comprises glass, this includes filter glasses, for example, such as neutrally and/or spectrally filtering glasses, e.g. blue glass. These may in particular be glasses which comprise phosphates or fluorophosphates, with and without further constituents, such as color-imparting constituents, and also glasses which are doped or comprise phosphates or fluorophosphates and which are used for generating laser radiation.

According to one embodiment, the optical material is in particular designed so as to comprise or consist of phosphate glasses such as, e.g., blue filter glasses made of SCHOTT® glasses S8612, BG39, BG50, or BG55, BG56, BG57, BG60, BG61 which transmit UV and visible light and absorb red light and infrared radiation, as well as active laser components, including for example SCHOTT® glasses such as LG750, LG760, LG770, APG1, LG940, LG950, or LG960. By way of example, the optical material may comprise or consist of the glass available from SCHOTT® AG under the name N-PK51.

Such glasses are described in European patent application EP 1 714 948 A2 and in international patent application WO 94/08373 A1, by way of example.

According to a further embodiment of the invention, the optical material may be a solid material (or bulk material), but may also be provided in the form of a layer which is applied to a further material, for example a carrier or substrate. In this case, the substrate itself may consist of or include an optical material.

The term "optical materials" in particular encompasses materials which are used specifically for optimization, i.e. modification, manipulation or else for the most complete possible transmission of electromagnetic radiation in the optical path of optical systems.

Optical Component. In the context of the present invention, "optical component" is understood to mean a component by means of which electromagnetic radiation is generated according to predetermined specifications, or electromagnetic radiation is filtered so that, for example, only a specific preferred portion of the electromagnetic radiation is transmitted through the filter, or electromagnetic radiation is altered, for example in terms of its direction of propagation, intensity, and/or in terms of its distribution, e.g. in terms of its spatial distribution, for example by focusing or defocusing, or serves for the most complete possible transmission of electromagnetic radiation according to predetermined properties. Such components include, by way of example and not limitation, refractive optical elements, for example in the form of lenses, such as spherical or aspherical lenses or convex or concave lenses, for example biconvex, biconcave, and/or concave-convex lenses. Furthermore, such optical components also include diffractive optical elements such as Fresnel lenses, and furthermore also reflective components such as mirrors, or partially reflective components such as beam splitters, as well as components which are used for filtering electromagnetic radiation, for example in the form of color filters. Furthermore, optical components in the context of the present invention also include combinations of a plurality of optical components, for example in the form of a combination of different lenses such as, e.g., in the form of achromats, apochromats, or objective lenses. Furthermore, such optical components also include components made of optically non-linear optical materials such as, e.g., active laser components, such as laser rods and laser plates, optically active components for frequency doubling, frequency mixing, and optical parametric oscillators.

Degradation. In the context of the present invention, "degradation" of a material is understood to mean the undesired alteration of properties of the material in question due to chemical reactions and/or physical processes, undesired alteration herein meaning that the respective alteration worsens at least one essential property of the material in question so that the material can no longer or only partially fulfill its intended function. By way of example, degradation of a material involves the decomposition of that material in the form of transformation and/or dissolution, e.g. the dissolution of a solid material in a fluid such as water, loss of mechanical stability of the material, for example as a result of reactions that alter important parameters of the material, e.g. its density, volume, breaking strength, and/or coefficient of linear thermal expansion, loss and/or or impairment of special optical properties, such as transparency, and/or refractive index, and/or reflectance. By way of example, but not necessarily, the degradation may be characterized by the formation of secondary products resulting from the chemical reactions, for example so as to cause a surface layer or crust of degradation materials to be formed as a result of degradation. Possible chemical reactions which are encompassed by the term "degradation" in the sense of the present invention include, for example, the formation of a phosphate crust and/or of a wide variety of polyphosphates on the surface of a phosphate-containing glass. Physical processes which are encompassed by the term "degradation" in the sense of the present invention include, for example, swelling processes in the form of physisorption, or chipping or flaking off of optional surface layers of a material. Thus, degradation of a material in the sense of the present invention in particular encompasses any chemical reaction and/or any physical process which impairs the optical properties, i.e. the property of the material or its surface, for example of a material or of the surface of a material of a component, to interact with electromagnetic radiation in a certain precisely specified manner, and/or which deteriorates the mechanical properties of the material, for example a material of a component, in particular its physical integrity, i.e. its persistence as a body with a defined surface contour, for example in the form of a spherical lens or in the form of a cylindrical rod.

Therefore, in the context of the present invention, an optical component, in particular an optical component with improved degradation resistance comprises those components which exhibit improved resistance when compared to conventional components, to chemical reactions and/or physical processes that tend to deteriorate important material properties of at least one optical material of the component such that the specifications can no longer be complied with, for example in the form of increased service life of the optical component, or the option to use this optical component under reactive environmental conditions, for example in direct contact with fluids that have a degrading effect, such as for cooling purposes in water. This improvement may, for example, become evident by the fact that a component is made of a material exhibiting the chemical property of incurring a certain weight loss in water at 50° C. [expressed in $mg/(cm^2*day)$], while the component with improved degradation resistance then incurs a lower weight loss on its surface. Furthermore, this improvement may, for example, become evident by the fact that a component has a certain service life under specific controlled environmental conditions, e.g. at 22° C. and 50% relative humidity, after which the component must be replaced, while the component in particular with improved degradation resistance then need to be replaced only after a longer time period.

The optical component in particular with improved degradation resistance comprises an optical material and a coating. The optical material has a native surface, which is in particular susceptible to degradation.

Native surface is understood to mean the surface of the material when provided in its initial form, that is, for example, in the form in which the surface is obtained in the manufacturing process of the material. In the context of the present invention, manufacturing process in this sense refers to the fabrication of a material from a melt, for example, but also to the mechanical separation of a material such as in a cutting or sawing process, for example. Furthermore, this also includes surface treatments such as polishing or lapping or etching, for example wet-chemical etching or ion beam etching. Also, such a native surface may be obtained in a coating process such as sputter deposition or vapor deposition. Hence, a native surface of a material is therefore also given in particular if the surface has the composition of the bulk material, except for unavoidable deviations which result from the nature of an interface. This means that a native surface is also given when no interface reactions, through which secondary phases are formed on the surface, in particular as a degradation product of the material, have occurred on the surface.

Native surfaces in this sense are for example: the surface of a glass after the melting process; and the surface of a glass after a singularization process.

By contrast, surfaces of a material, which do not constitute native surfaces in this sense are: the surface of a phosphate-containing glass resulting after formation of a phosphate crust which comprises polyphosphates, for example.

Generally, in the context of the present invention, susceptibility to degradation processes is understood to mean in particular that a chemical reaction and/or a physical process which adversely affects the durability of the material so that the chemical, mechanical, optical, and/or other functionality of the material is no longer ensured or only to a reduced degree, are favored thermodynamically and/or kinetically.

In the context of the present invention, susceptibility to degradation processes for a material and/or a surface of a material is in particular given when the reaction equilibrium is deprived of a product of the chemical reaction and/or of the physical process which adversely affects the durability of the material so that the chemical, mechanical, optical, and/or other functionality of the material is no longer ensured or only to a reduced degree; and/or an educt of the chemical reaction and/or the physical process which adversely affects the durability of the material so that the chemical, mechanical, optical, and/or other functionality of the material is no longer ensured or only to a reduced degree, is present in excess.

For example, such a susceptibility exists when a product of a reaction and/or of a process is removed from the reaction equilibrium, for example by precipitation of a solid product; and/or when an educt of the reaction and/or of the process is present in excess, for example in the form of an oversupply of a solvent, such as water.

Furthermore, the optical component comprises a coating, and this coating comprises a layer comprising an inorganic material. The coating is applied on the optical material so as to be substantially contiguous, at least in portions thereof. A coating or a layer is said to be contiguous when there are no continuous paths between a fluid surrounding the optical component, for example a surrounding gaseous or liquid medium, and the optical material, at least in the area in which the coating or layer is applied on the optical material and/or the surface of the components is in contact with the surrounding fluid. This means in particular that the layer comprising an inorganic material has no defects and/or cracks and/or so-called pinholes, at least in the region of a surface area of 0.1 mm$^2$, preferably 10 cm$^2$, and most preferably 100 cm$^2$. According to one embodiment, the layer comprising an inorganic material has no defects and/or cracks and/or so-called pinholes over an area of at least 90% of the surface area of the body of the optical material.

In the context of the present invention, "at least in portions thereof" means that at least an area which should not degrade is coated. This may include, for example, laser rods or filter windows, for example of sensors, in particular sensors of digital cameras, and their image-capturing assemblies, in particular semiconductors such as CCD or CMOS sensors which are simply also referred to as camera chips, which should not degrade on the surfaces where electromagnetic radiation exits (exit surfaces), whereas for instance on the lateral surfaces thereof, degradation is also not desirable, but might possibly be accepted.

The coating may comprise one or more layers. If the coating comprises only one layer, i.e. is formed as a single layer, it can also be referred to as a layer in the context of the present invention.

The material of the coating is preferably less susceptible to degradation than the optical material.

The optical component has a degradation resistance such that: after 24 hours of storage at a temperature of 85° C. and a relative humidity of 85%, preferably after 200 hours of storage at a temperature of 85° C. and a relative humidity of 85%, most preferably after 1000 hours of storage at a temperature of 85° C. and a relative humidity of 85%, and/or after six months of storage of the component in deionized water at a temperature of 25° C., the optical and/or mechanical functionality of the component as determined by installation and intended use of the component does not deviate by more than 5% from the initial values of optical and/or mechanical functionality, and/or no additional defects greater than 10 µm arise, preferably no additional defects greater than 5 µm, more preferably no additional defects greater than 1 µm, in particular as determined according to the ISO 10110 standard, and/or no detachment of the coatings and/or no strong color changes occur, preferably no color changes at all.

Here, storage at a temperature of 85° C. and a relative humidity of 85% is rather required for filter glass (blue glass, BG) components, and storage in deionized water is rather required for laser glass (LG) components.

Optical defects are preferably determined by optical determination, for example by observation with a microscope, in particular under specially adapted illumination and under adapted environmental conditions such as mentioned in the ISO 10110 standard, for example.

For the purposes of the present invention, a color change is referred to as strong or significant, if the color coordinates prior to being subjected to stress and the color coordinates after having been subjected to stress, i.e. storage under defined conditions in this case, deviate from each other by a value ΔE of greater than 0.05, determined as a change in color coordinates in the CIE1931 system. The change in color coordinates ΔE is given by the following formula:

$$\Delta E = \sqrt{(x^2 + y^2)}$$

According to one embodiment of the invention, the color change defined as a difference between the color coordinates prior to and after subjection to stress, such as storage under defined environmental conditions, which is characterized by change in color coordinates ΔE, has a value of less than 0.05, preferably less than 0.03, and more preferably less than 0.02.

According to one embodiment of the invention, the optical material comprises one of the following materials: an inorganic non-metallic material; and/or an organic material.

According to one embodiment of the invention, the optical material may be provided as a solid or bulk material, but also in the form of a layer which is applied to a further material, for example a carrier or substrate. In this case, the substrate itself may consist of or comprise an optical material.

According to another embodiment of the invention, the optical material is or comprises an inorganic non-metallic material, preferably an amorphous inorganic non-metallic material, and more preferably a glass.

Preferably, the optical material is or comprises a phosphate glass, preferably a phosphate glass including color-imparting, filtering, and/or optically active components.

According to one embodiment of the invention, the glass has a content of at least 10 wt % of $P_2O_5$, preferably at least 15 wt % of $P_2O_5$, and most preferably at least 20 wt % of $P_2O_5$, and has a content of at most 80 wt % of $P_2O_5$, wherein a content of $P_2O_5$ from 50 wt % to 80 wt % is most preferred.

According to a further embodiment of the invention, the layer comprising an inorganic material is provided in the form of an inorganic oxidic coating, preferably an inorganic amorphous oxidic coating, for example comprising $Al_2O_3$, $SiO_2$ and/or $TiO_2$, or mixtures thereof.

Furthermore preferably, the coating has a thickness of at least 1 nm, preferably at least 5 nm, more preferably at least 10 nm, and most preferably at least 20 nm, and of at most 10,000 nm, preferably at most 1,000 nm, more preferably at most 500 nm, and most preferably at most 200 nm.

According to a further embodiment of the invention, the coating covers at least partially the surface area of the optical component, which is in contact with a fluid reactive with the optical material.

Such a fluid that is reactive with an optical material may already be given during storage and/or use of the optical material in air at 25° C., for example. Depending on the chemical nature of the material, degradation of the optical material may in particular already occur during such a storage, by atmospheric humidity. For example, in some filter applications the humidity of normal ambient air alone is already problematic over time. Hence, a reactive fluid in the sense of the present invention is normal ambient air, for example.

In more sophisticated applications, for example in some laser applications, the optically active medium, e.g. a rare-earth ions containing phosphate glass, even needs to be cooled using a cooling liquid. In some cases, recourse is had to perfluorinated solvents which are also used as coolants in automobiles. However, below 100° C., their thermal performance is not as good as that of water, especially in terms of heat capacity, and moreover they may imply additional challenges, such as complex fire prevention, or thermal streaks or wavefront errors. For this reason, water is still used as a coolant in high-power laser systems, and in this case the laser surfaces of laser rods are encapsulated, and the cylindrical rough lateral surface is enclosed by water, or in the case of laser plates, the active laser surfaces, i.e. the surfaces through which the laser beam exits from the material, are rinsed or surrounded by water. However, this leads to a certain removal of material over time, which has so far not been sufficiently reduced by certain measures, such as etching processes. Therefore, especially optical materials for such high performance systems are expendable materials which need to be replaced regularly, for example after one to two years.

In order to prevent or at least reduce such degradation that leads to high material consumption, the optical material of the optical component according to the present invention is provided with at least one coating comprising a layer comprising an inorganic material.

According to a further embodiment of the present invention, the coating is applied over the entire surface so as to cover or enclose the optical material over the entire surface thereof.

According to another embodiment of the invention, the optical material is in the form of a body having an outer surface, and the coating comprising a layer comprising an inorganic material is applied so as to at least partially cover the optical material on at least one of the faces defining the surface of the body, preferably at least 80% thereof. For example, according to one embodiment, the coating may be applied on at least one lateral surface and/or at least one optically active face of the optical material, at least on a portion thereof, preferably on at least 80% thereof.

According to yet another embodiment, the coating covers all optical faces, and more preferably all faces of the optical material. The surfaces of the optical material may be of any desired design, in particular flat or curved, or they may have steps. It is also possible that a surface of the material is rough, for example rough-sawn, or lapped, or smooth, in particular also polished.

Advantageously, according to a further embodiment of the invention, the coating is provided in the form of a multi-layer system so that consecutive layers have at least partially a different composition.

According to yet another embodiment of the invention, the optical component has a further coating in addition to the coating comprising a layer comprising an inorganic material. This further coating overlaps the coating comprising a layer comprising an inorganic material at least in a portion thereof such that the coating comprising a layer comprising an inorganic material is disposed either over or below the further coating. According to a further preferred embodiment of the invention, a sequence of coatings is provided such that the coating comprising a layer comprising an inorganic material and at least one further coating applied thereon define an optically active layer system, for example a coating system that reduces reflection or enhances reflection.

Such coating systems typically comprise a sequence of layers having different refractive indices, for example low refractive index layers such as layers comprising $SiO_2$ and/or $MgF_2$, and high refractive index layers such as layers comprising $Nb_2O_5$, $Ta_2O_5$, $HfO_2$, $Al_2O_3$, $Sc_2O_5$, and/or $TiO_2$. The layers may as well comprise mixtures of different materials, for example $SiO_2$ and $Al_2O_3$, preferably with a content of $Al_2O_3$ between 5 wt % and 20 wt %, and a content of $SiO_2$ between 95 wt % and 80 wt %.

According to a preferred embodiment, a coating system of the following type is provided. The optical component comprises a laser glass, i.e. an optical material which can be used to generate laser radiation. These include, for example, optical glasses LG750, LG760, LG770, APG1, LG940, LG950, or LG960 available from Schott AG, Mainz. Onto this optical component, a multi-layer coating system is applied, comprising layers of high refractive index and/or low refractive index material. In a favorable embodiment, between 2 and 8 of such layers are applied, and $SiO_2$ is chosen as the low refractive index material, and the high refractive index material comprises any one of the following materials: $Ta_2O_5$, $Al_2O_3$, $HfO_2$, $ZrO_2$, or $Nb_2O_5$. High refractive index and low refractive index layers can be applied alternately. The layer sequence may as well be formed by layers consisting of more than 2 materials, or of gradient layers. The coating process is executed at a coating temperature between 40° C. and 350° C. in a coating apparatus.

An exemplary layer system for a laser glass LG760 with an antireflective effect at a laser emission wavelength of 1054 nm includes, e.g., layer 1: 65.9 nm of $HfO_2$, and layer 2: 223.2 nm of $SiO_2$, and in this case, at 1054 nm, the refractive indices of the three materials involved are as follows: LG760: 1.508, $HfO_2$: 1.90, $SiO_2$: 1.45.

Another exemplary layer system for a laser glass LG760 with an antireflective effect at a laser emission wavelength of 1054 nm includes, e.g., layer 1: 54.0 nm of $Ta_2O_5$, and layer 2: 228.9 nm of $SiO_2$, and in this case, at 1054 nm, the refractive indices of the three materials involved are as follows: LG760: 1.508, $Ta_2O_5$: 2.02, $SiO_2$: 1.45.

Another exemplary layer system for a laser glass LG760 with an antireflective effect at a laser emission wavelength of 1054 nm includes, e.g., layer 1: nanolaminate (alternately 3 nm of $Ta_2O_5$ and 3 nm of $Al_2O_3$ in each case) of 102 nm in total, and layer 2: 205.3 nm of $SiO_2$, and in this case, at 1054 nm, the refractive indices of the three materials involved are as follows: LG 760: 1.508, nanolaminate (effective refractive index) $Ta_2O_5/Al_2O_3$: 1.82, $SiO_2$: 1.45.

Another exemplary layer system for a laser glass LG940 with an antireflective effect at a laser emission wavelength of 1532 nm includes, e.g., layer 1: 100 nm of $Ta_2O_5$, and layer 2: 321 nm of $SiO_2$, and in this case, at 1532 nm, the refractive indices of the three materials involved are as follows: LG940: 1.522, $Ta_2O_5$: 2.00, $SiO_2$: 1.44.

According to a further preferred embodiment, a coating system of the following type is provided, which is applied onto an optical component comprising a blue filter glass as the optical material. Blue filter glasses are available from Schott AG, Mainz, for example, under the designation S8612, BG39, BG50, or BG55, BG56, BG57, BG60, BG61, or other glasses of the BG series. Onto this optical component, a multi-layer coating system is applied comprising layers of high refractive index and/or low refractive index material. In a favorable embodiment, between 4 and 12 of such layers are applied, and $SiO_2$ is selected as the low refractive index material, and the high refractive index material comprises any one of the following materials: $Ta_2O_5$, $Al_2O_3$, $HfO_2$, $Nb_2O_5$, $TiO_2$, or $ZrO_2$. High refractive index and low refractive index layers can be applied alternately. The layer sequence may as well be formed by layers consisting of more than 2 materials, or of gradient layers. The coating process is executed at a coating temperature between 40° C. and 350° C. in a coating apparatus.

An exemplary layer system for a blue filter glass BG39 having an antireflective effect in the portion of the visible range where BG39 is transparent includes, e.g., layer 1: 14 nm of $SiO_2$, layer 2: 14 nm of $TiO_2$ mixed with $Al_2O_3$, layer 3: 29.5 nm of $SiO_2$, layer 4: 114 nm of $TiO_2$ mixed with $Al_2O_3$, layer 5: 81.7 nm of $SiO_2$, and in this case, at 550 nm, the refractive indices of the three materials involved are as follows: BG39: 1.54, $SiO_2$: 1.44, $TiO_2$ mixed with $Al_2O_3$, ($TiO_2$ mixed with $Al_2O_3$ is available, for example, under the name "DRALO" from company UMICORE): 2.12.

Another exemplary layer system for S8612 having an antireflective effect in the portion of the visible range for which BG39 is transparent includes, e.g., layer 1: 35.5 nm of $SiO_2$, layer 2: 15 nm of $TiO_2$ mixed with $Al_2O_3$, layer 3: 52.4 nm of $SiO_2$, layer 4: 42 nm of $TiO_2$ mixed with $Al_2O_3$, layer 5: 20.7 nm of $SiO_2$, layer 6: 53.7 nm of $TiO_2$ mixed with $Al_2O_3$, layer 7: 95.8 nm of $SiO_2$, and in this case, at 550 nm, the refractive indices of the three materials involved are as follows: S8612: 1.54, $SiO_2$: 1.44, $TiO_2$ mixed with $Al_2O_3$, ($TiO_2$ mixed with $Al_2O_3$ is available, for example, under the name "DRALO" from company UMICORE): 2.12.

Suitable base glasses are phosphate or fluorophosphate glasses preferably having a content of $P_2O_5$ of at least 50 wt %, more preferably at least 55 wt %, and/or preferably not more than 85 wt %, more preferably not more than 80 wt %. Furthermore, such glasses may preferably contain $Al_2O_3$ in a content of at least 1 wt %, more preferably at least 2 wt %, and/or preferably not more than 20 wt %. As further components, the phosphate glasses may contain fluorine (preferably >0 to 30 wt %), one or more oxides of alkali metals ($Li_2O$, $Na_2O$, $K_2O$, preferably from 0 to 20 wt % in total), alkaline earth metals (MgO, CaO, BaO, SrO, preferably from 0 to 40 wt % in total), and oxides of the elements Si, B, Zn, La, Gd, Nb, Y, Bi, Ge, and/or Pb. Such glasses are described, for example, in US 2017/0217828, U.S. Pat. No. 5,526,369, 5,032,315, 5,173,456, 4,929,387, EP 1 714 948 A2, DE 10 2011 056 873, DE 10 2012 210 552, and DE 10 2017 207 253, the disclosures of which is fully incorporated into the present description by reference.

Base glasses suitable for the invention have the following composition in wt %, for example:

| wt % | from | to |
| --- | --- | --- |
| $P_2O_5$ | 25 | 75 |
| $Al_2O_3$ | 0.5 | 15 |
| MgO | 0 | 10 |
| CaO | 0 | 16 |
| BaO | 0 | 30 |
| SrO | 0 | 16 |
| ZnO | 0 | 10 |
| $Li_2O$ | 0 | 13 |
| $Na_2O$ | 0 | 10 |
| $K_2O$ | 0 | 11 |
| Σ RO(R = Mg, Ca, Sr, Ba) | >0 | 40 |
| Σ $R_2O$(R = Li, Na, K) | >0 | 20 |
| $F/F_2$ | 0 | 30. |

In addition to the constituents of the base glass mentioned above, laser glasses contain laser-active components, e.g. ytterbium ions and/or erbium ions (e.g. in glasses LG960, LG950, and LG940 produced by SCHOTT AG), neodymium ions (e.g. Nd:YAG, SCHOTT glasses APG1, APG760, LG680, LG750, LG760, LG770), chromium ions, and/or cobalt ions.

Blue glasses additionally contain CuO in a content of 0.1 to 20 wt %, in addition to the constituents of the base glass.

According to yet another embodiment of the invention, the optical material is provided in the form of a body which at least in a portion of one of its faces has a roughness determined as a root mean square roughness, RMS, of not more than 8 nm, not more than 4 nm, preferably not more than 2 nm, more preferably not more than 1 nm, and most preferably not more than 0.5 nm. This portion is at least partially provided with the coating comprising a first layer which comprises an inorganic material or consists of inorganic material.

According to yet another embodiment, the optical material is in the form of a body which at least in a portion of one of its faces has a roughness determined as a root mean square roughness, RMS, of at least 0.5 μm, preferably at least 1 μm.

Another aspect of the present invention relates to the provision of a method for producing an optical component, preferably an optical component having improved degradation resistance. The method comprises the steps of: providing an optical material, applying a coating comprising a layer comprising an inorganic material onto a surface of the optical material, wherein the coating is applied onto the surface of the optical material so as to be contiguous, at least in portions thereof.

Preferably, the applying of the coating comprising a layer comprising an inorganic material is accomplished by a chemical vapor deposition (CVD) process. This has the advantage that the application does not occur in a directed manner, but rather in a way so that all surfaces of the material are coated equally, so that even complex geometries can be covered. In this way it is in particular possible to completely coat bodies having a cylindrical shape, that means, for example, even the lateral surface of a cylindrical rod. Also, it is possible in this way to completely coat rough (e.g. ground and non-polished) surfaces, grooves and holes, in particular also contiguously.

According to one embodiment of the invention, the applying of the coating is accomplished by a plasma-assisted CVD process, e.g. PECVD or PICVD, or by atomic layer deposition (ALD).

Preferably, organic precursor compounds of the layer materials are used as precursor materials.

In particular, organic aluminum compounds such as trimethylaluminum are used as precursor materials for $Al_2O_3$-containing layers, and silanes, in particular organically modified silanes, are used as precursor materials for $SiO_2$-containing layers.

EXAMPLES

The following tables give examples of optical components according to embodiments of the invention, as well as comparative examples.

TABLE 1

Examples 1 to 5

|  | Example 1 | Example 2 | Example 3 | Example 4 | Example 5 |
|---|---|---|---|---|---|
| Optical material | LG760 | APG1 | LG760 | LG760 | LG760 |
| Component | Laser rod | Laser rod | Laser rod | Laser disk | Laser rod |
| (Edge) Length | ~250 mm | ~250 mm | ~250 mm | 40 mm diameter × 7 mm | ~250 mm |
| Diameter | ~25 mm | ~25 mm | ~25 mm |  | ~25 mm |
| Coating 1 | single layer | single layer | single layer | single layer | AR system without final low-index layer |
| Method | CVD (ALD) | CVD (ALD) | CVD | CVD | PVD (ion beam sputter deposition) |
| Properties | low-index, $SiO_2$ | high-index, $Al_2O_3$ | low-index, $SiO_2$ | high-index, $Al_2O_3$ | AR |
| Coated surface | completely | completely | completely | completely | polished laser end faces |
| Coating 2 | none | single layer | AR system | AR system | single layer |
| Method | — | CVD | PVD | PVD | CVD |
| Layer properties | — | low-index; $SiO_2$ | AR | AR | low-index; $SiO_2$ |
| Coated surface | — | completely | polished laser end faces | polished laser end faces | completely |
| Optical material | LG760 | APG1 | LG760 | LG760 | LG760 |
| Coating 3 | none | AR system | none | none | none |
| Method | — | PVD | — | — | — |
| Layer system | — | AR | — | — | — |
| Coated surface | — | polished laser end faces | — | — | — |
| Resistance after 6 months DI water | yes | yes | yes | yes | yes |

TABLE 2

Examples 6 and 7, and comparative Examples 1 to 3

| Optical material | Example 6 BG60 | Example 7 BG55 | Example 8 S8612 | Comparative example 1 LG760 | Comparative example 2 BG55 | Comparative example 3 LG760 |
|---|---|---|---|---|---|---|
| Component | Filter | Filter | Filter | Laser rod | IR filter | Laser rod |
| (Edge) Length Diameter |  |  |  |  |  |  |
| Coating 1 | single layer | single layer | single layer | AR | AR | single layer |
| Method | CVD | CVD | CVD | PVD | PVD | PVD |
| Properties | low-index; $SiO_2$ | low-index; $SiO_2$ | nanolaminate $Al_2O_3$ and $Ta_2O_5$ | low-index; $SiO_2$ | AR |  |
| Coated surface | completely | completely | completely | polished laser end faces | surface |  |
| Coating 2 | AR system | AR system | none | none | none |  |
| Method | PVD | PVD |  |  |  |  |
| Layer properties | AR | AR |  |  |  |  |

TABLE 2-continued

Examples 6 and 7, and comparative Examples 1 to 3

| Optical material | Example 6 BG60 | Example 7 BG55 | Example 8 S8612 | Comparative example 1 LG760 | Comparative example 2 BG55 | Comparative example 3 LG760 |
|---|---|---|---|---|---|---|
| Coated surface | one surface | one surface | | | | |
| Resistance after 6 months DI water | | | | no, milky, blotchy, coating chipped off | | no, milky, blotchy, coating chipped off |
| Resistance after 1000 hours at 80° C./85% rel. humidity | yes | yes | yes | | no, milky, blotchy, coating chipped off | |

BRIEF DESCRIPTION OF THE DRAWINGS

The invention will now be explained by way of example with reference to the figures, wherein the same reference numerals designate the same or equivalent elements, and wherein.

DETAILED DESCRIPTION

Figure 1:
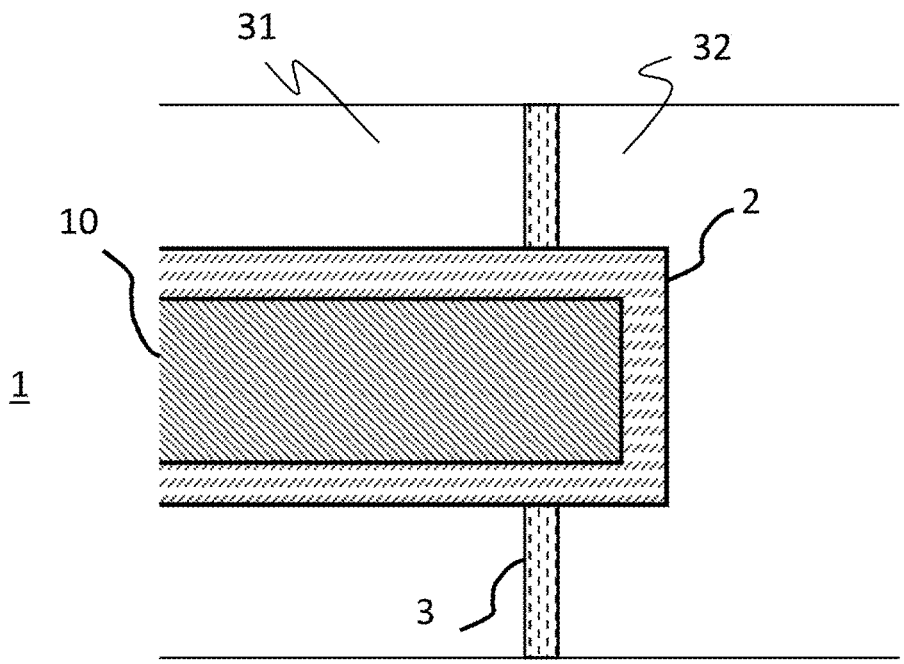
FIG. 1 schematically illustrates a longitudinal sectional view through an optical component.

FIG. 1 schematically illustrates a longitudinal sectional view through an optical component 1 according to an embodiment of the invention, not drawn to scale. Optical component 1 comprises an optical material 10 and a coating 2. This coating 2 comprises a layer comprising an inorganic material and was applied to the optical material 10 by a CVD process in a manner so as to completely encloses it. This coating 2 produced by a CVD process may be in the form of a low-index coating as well as a high-index coating.

By way of example, the here illustrated optical component 1 comprises, as the optical material 10, a phosphate-containing glass which furthermore comprises active components in the form of rare-earth ions. Thus, the optical material 10 is a so-called laser glass in this case, by way of example, which is used to generate laser radiation.

In order to generate laser radiation by so-called "optical pumping", it is furthermore necessary to partially cool the optically active medium, in the present case the optical material 10, using a liquid. By way of example, the optical material 10 is provided in the form of a cylindrical rod. This rod is encapsulated by an encapsulation 3 such that a portion of the lateral surface of the cylinder is surrounded by a liquid, such as water, for cooling purposes. Thus, the encapsulation 3 divides the environment of optical component 1 into at least two regions 31, 32, and in one region 31 the optical component comes into contact with a fluid which might degrade the optical material. For example, in the case of the phosphate-containing glass such as a glass comprising phosphate which is doped with rare-earth ions and serves to generate laser radiation, this fluid may entirely consist of water or comprise water. More generally, however, it is also possible that organic liquids are used as a coolant. Alternatively, the optical material may be provided in the form of a plate, e.g. a rectangular plate. This plate may now be surrounded by coolant on one side or on both sides. Both the laser beam and the pumping light beam pass through the large surfaces which are in contact with the cooling medium.

In the second region 32, the optical component 1 is surrounded by a less reactive fluid, for example normal ambient air. However, here too, the coating 2 improves the degradation resistance of the optical component 1. If the optical material 10 is a phosphate-containing glass, atmospheric moisture may already cause corrosion or degradation of the optical material.

Coating 2 is preferably applied by a CVD process.

Figure 2:
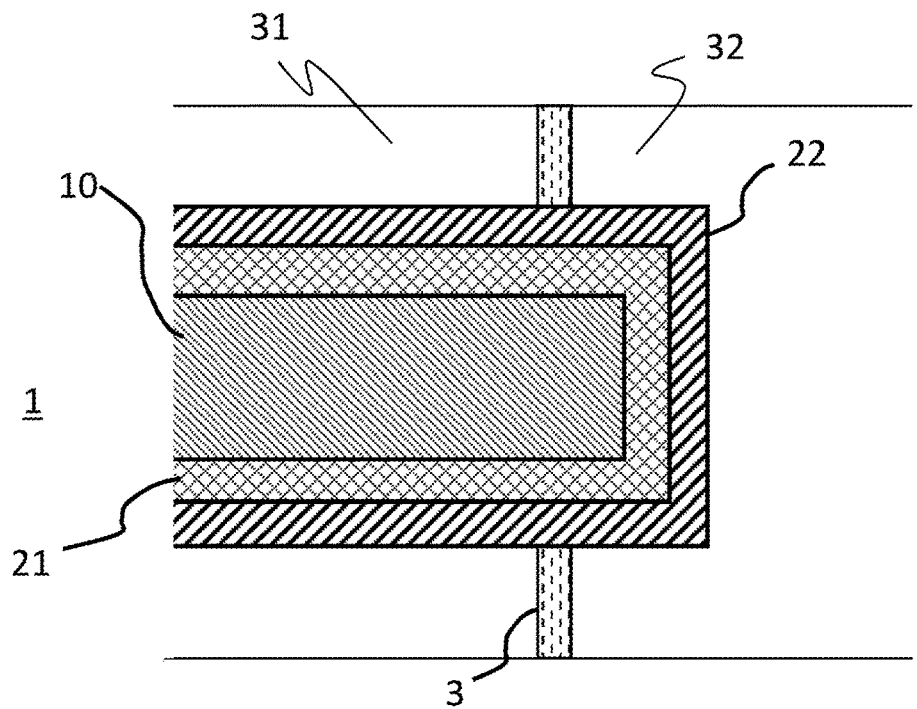
FIG. 2 schematically illustrates an optical component encapsulated by encapsulation.

FIG. 2 is a further schematic view, not drawn to scale, of an optical component 1 encapsulated by encapsulation 3. Here, optical component 1 consists of the optical material 10 which is provided with two coatings 21, 22. These two coatings 21, 22 enclose the optical material 10 completely, at least in portions thereof. Here, the optical material 10 is exemplified as a cylindrical rod made of a phosphate-containing glass, for example a phosphate-containing glass doped with rare-earth ions, which can be employed to generate laser radiation.

The two coatings 21, 22 were each obtained by CVD. Coating 21 which is directly disposed on the optical material 10 is designed as a high refractive index layer, for example consisting of $TiO_2$ or comprising $TiO_2$, and coating 22 applied thereon is designed as a low refractive index layer, for example consisting of or comprising $SiO_2$. The system of the two coatings 21, 22 thus provides a water barrier as well as an optically active layer system which is formed on the end face of optical component 1 as an antireflection system.

Furthermore, the two regions 31 and 32 are indicated representing different environments of the optical component 1. By way of example, region 31 may be a particularly degrading region here, where the optical component 1 is surrounded by a liquid that degrades the optical material 10, for example. Region 32, by contrast, will usually be less degrading. For example, optical component 1 may be surrounded by air in this region, by way of example.

Figure 3:
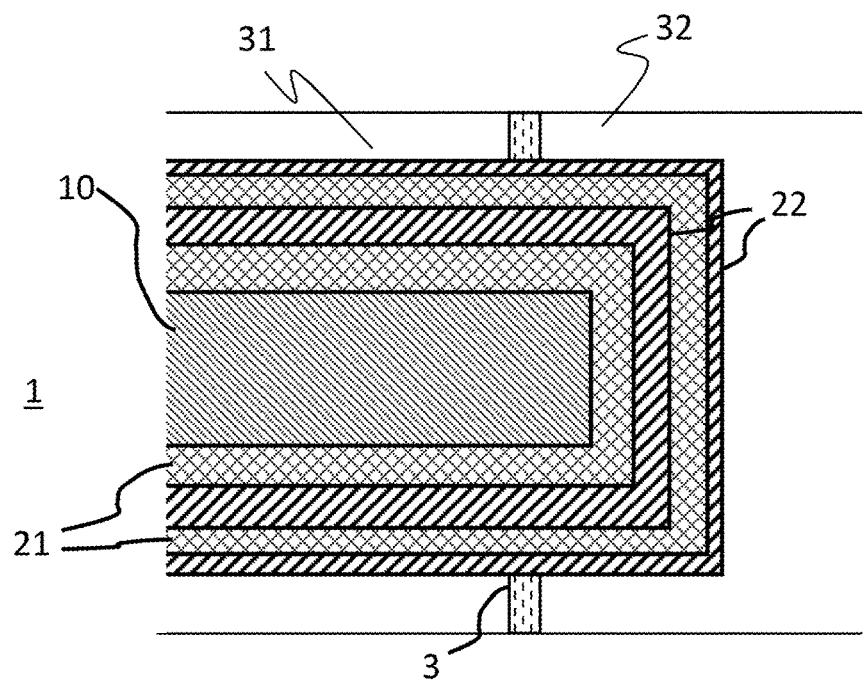
FIG. 3 schematically illustrates an optical component encapsulated by encapsulation.

A further refinement is shown in FIG. 3, which is a further schematic view, not drawn to scale, of an optical component 1 encapsulated by encapsulation 3. Here, the optically active layer system comprises more than two coatings, namely four coatings, by way of example, wherein these coatings are each formed as single layers here, so that the third layer 21 again comprises $TiO_2$, and the fourth layer 22 again comprises $SiO_2$, as illustrated. More generally, without being limited to the example illustrated herein, the high-index layers 21 may as well comprise other materials than $TiO_2$, for example they may comprise $Al_2O_3$, additionally or alternatively, or another material. Furthermore, it is generally possible for the high-index and/or low-index layers 21, 22 to differ from each other in terms of their composition. For example, a first low-index layer 22 may have a different composition than a further low-index layer 22 in a layer system. This similarly also applies to the high-index layers 21.

Figure 4:
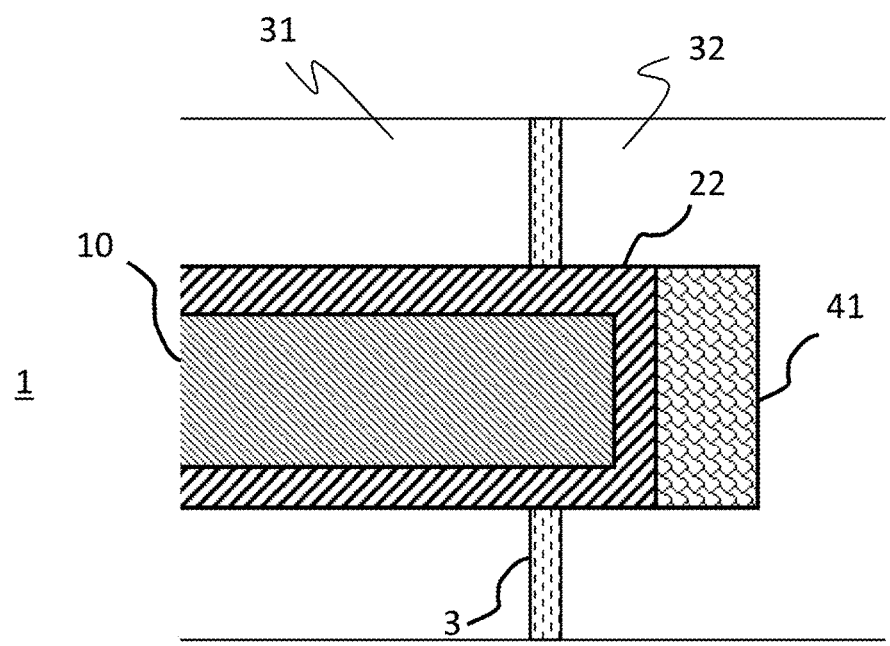
FIG. 4 schematically illustrates an optical component with a coating.

FIG. 4 is another schematic view, not drawn to scale, of the optical component 1, here exemplified as a cylindrical rod made of an optical material 10, which is provided with a coating, here the low-index barrier coating 22, for example consisting of or comprising $SiO_2$. This coating 22 completely encloses the optical material 10 and is produced by a chemical vapor deposition process (CVD process).

Furthermore, a coating 41 is applied on the end face of the cylindrical rod. This coating 41 was applied by a PVD process, i.e. by physical vapor deposition. Such PVD processes are directed processes which are not suitable for coating three-dimensional geometries, but only for approximately two-dimensional surfaces, e.g. by electron beam vapor deposition (also plasma-assisted), ion beam or magnetron sputter deposition.

Coating 41 may be configured as a single layer, for example, but also as a layer system, i.e. may comprise a plurality of layers of materials having different refractive indices.

Figure 5:
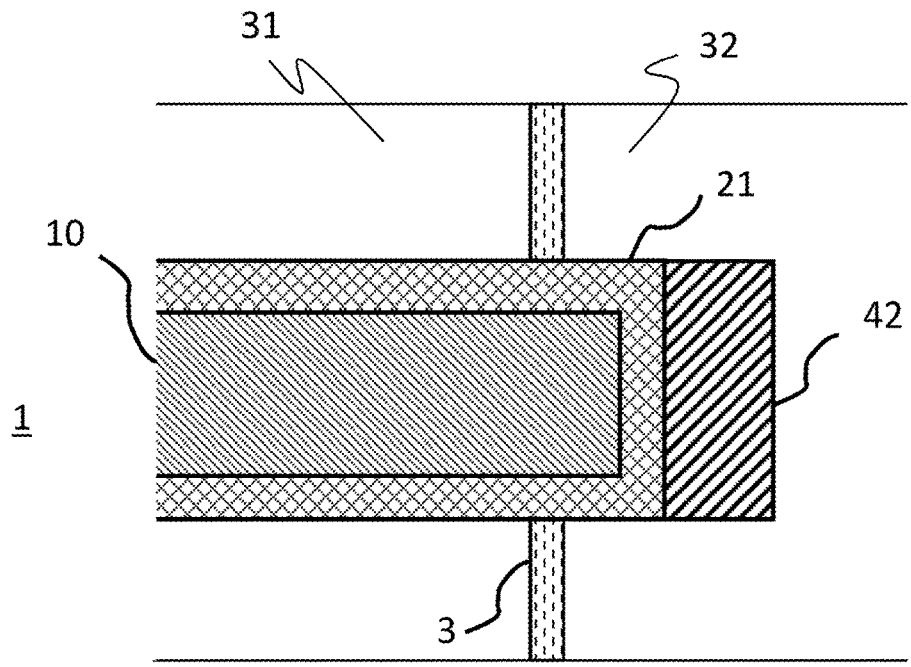
FIG. 5 schematically illustrates an optical component with a high-index barrier layer.

FIG. 5 is a schematic view of a further embodiment of an optical component 1. Optical component 1 is again exemplified as a cylindrical rod made of an optical material 10 which is completely enclosed by a high-index barrier layer 21 in this example, which was produced by a chemical vapor deposition (CVD) process.

Furthermore, a coating 42 is applied on the end face of the cylindrical rod. This coating 42 was applied by a PVD process, i.e. by physical vapor deposition. Coating 42 may consist of a low refractive index layer or may comprise a plurality of layers, and the combination of coating 21 and coating 42 on the end face of the rod defines an AR coating.

More generally, without being limited to the example shown in FIG. 5, the optical component 1 can as well be provided in the form of a slice or disk, for example a slice comprising a blue glass, which is used as a filter, for example. In such an application, the optical component 1 may as well be provided in a form so that the component 1 is applied to and fixed on a substrate, for example by an adhesive including epoxy resin. In this case, the environment with normal environmental conditions is considered to be the area of the blue glass which is in contact with the adhesive, whereas the non-supported areas of the blue glass are considered to be in contact with a region 32 with degrading environmental conditions.

Figure 6:
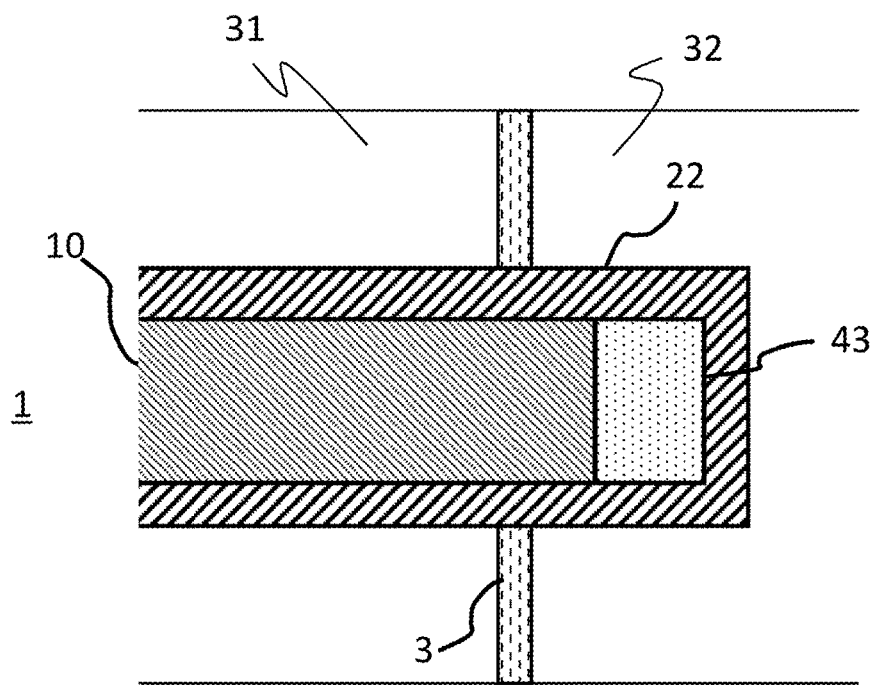
FIG. 6 schematically illustrates an optical component with a coating.

Furthermore, FIG. 6 schematically shows yet another embodiment of an optical component 1 according to the present invention. Here, the optical component comprises the optical material 10 which is again provided in the form of a cylindrical rod, for example. In this case, first, a coating 43 is applied to the end face of the rod by a physical vapor deposition process (PVD process), consisting of multiple layers here, which form the basis of a layer system with an antireflective (AR) effect. Here, the coating 22 which completely encloses the optical material 10 and the coating 43 applied to at least the one of the end faces of the rod that is illustrated here, is effective as a final low refractive index coating for completing the AR layer system. Coating 22 is formed of a low refractive index material in this case, and is applied by a CVD process, i.e. by chemical vapor deposition.

More generally, without being limited to the example shown in FIG. 6, the optical component 1 may as well be provided in the form a slice or disk, for example a slice comprising a blue glass which is used as a filter, for example. In such an application, the optical component 1 may as well be provided in a form so that the component 1 is applied to and fixed on a substrate, for example by an adhesive including epoxy resin. In this case, the environment with normal environmental conditions is considered to be the area of the blue glass which is in contact with the adhesive, whereas the non-supported areas of the blue glass are considered to be in contact with a region 32 with degrading environmental conditions.

Figure 7:
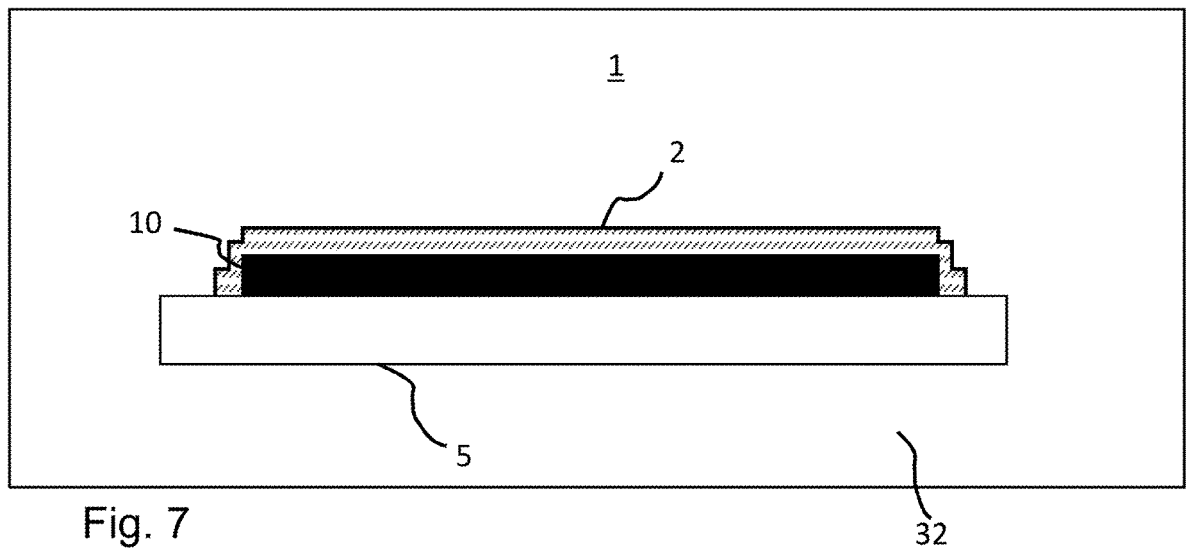
FIG. 7 schematically illustrates an optical component with a layer.

FIG. 7 is a further schematic view, not drawn to scale, of an optical component 1 according to an embodiment of the invention. Optical component 1 is made of an optical material 10 which is provided in the form of a layer here, by way of example. The layer may be a glassy layer, for example, such as a layer comprising a phosphate glass. In the present case, the layer is applied on a carrier or substrate 5. This carrier or substrate 5 may itself also comprise an optical material. Here, the optical material 10 is contiguously enclosed by a barrier coating 2, so that the strongly degrading environmental conditions in region 32 do not degrade the material 10.

In order to determine the degradation resistance of the optical component, i.e. of the optical material and the coating applied thereto, environmental resistance tests were performed on a multitude of samples. For this purpose, different coating systems were applied onto a common blue filter glass S8612 as the substrate material, which is available from Schott AG, Mainz. This type of glass is considered to be very sensitive to moisture and thus to be a very critical type of glass with respect to a possible tendency to degradation. For example, this type of glass is significantly more sensitive to moisture than other blue filter glasses, such as BG55 or BG60.

Different coating systems were applied onto the blue filter glass S8612, comprising different arrangements of high refractive index and low refractive index layers. $SiO_2$ was selected as the low refractive index material, and one of the following materials was selected as the high refractive index material: $Ta_2O_5$, $Al_2O_3$, $HfO_2$, $Nb_2O_5$, $TiO_2$, or $ZrO_2$. The coatings have a total thickness of between 5 and 100 nm.

The substrates provided with the different coating systems were then placed in a climate chamber where they were exposed to different temperatures which were constant over the test period, at a relative humidity of 85%. The temperatures were 100° C., 200° C., and 250° C.

A possible degradation of the coating systems was investigated and analyzed at regular intervals. This included a visual inspection of the coated substrates with the human eye according to standards ISO 10110 or MIL 13830 at 36 W cold light, color temperature 5600 K, fluorescent tube, not collimated, through an opal glass sheet, against a black background without additional ambient light. In such a test arrangement, relevant degradation signs such as delamination or cracks, but also a catastrophic failure, are clearly visible.

An investigation of the substrates introduced into the climate chamber with regard to possible degradation signs of the substrates or the applied coating systems was performed after a period of 250 hours, after 500 hours, and after 1000 hours.

For comparison, blue filter glasses S8612 were furthermore provided with commonly known AR coating systems and were also introduced into the climate chamber for comparison.

It was found that the prior art AR coating systems exhibit catastrophic failure after only 250 hours. This included destruction of the layer and/or the formation of a matte, turbid surface, so that pure transmission of electromagnetic radiation is no longer possible in the visible wavelength range.

By contrast, samples according to the invention with ALD coatings, i.e. where the layers were produced by atomic layer deposition, show hardly any degradation signs. In particular, the optical and/or mechanical functionality of the component deviates by not more than 5% from the initial values for optical and/or mechanical functionality. Also, there are no additional defects greater than 10 μm, and no additional defects greater than 5 μm, and no additional defects greater than 1 μm. Furthermore, neither were there observed any detachments of the ALD coatings and/or of individual layers of the ALD coating system, nor any color changes.

After 500 hours, degradation signs could be observed on some samples with ALD coating systems. However, while in the case of samples with prior art AR coatings it was observed that the coating already delaminates or even has completely peeled off and the substrate is being dissolving, such signs have not been observed in samples with coating systems according to the present invention.

The following overview lists some coating systems according to the invention, which showed only very slight degradation signs after 1000 hours, and these degradation signs did not occur over the whole surface but locally limited, while major portions of the surface showed no degradation at all.

| Material | T [° C.] | Layer thickness [nm] | Nano-laminate |
|---|---|---|---|
| Al$_2$O$_3$ plasma-assisted | 100 | 100 | |
| Al$_2$O$_3$ plasma-assisted | 200 | 100 | |
| Al$_2$O$_3$ thermal | 100 | 100 | |
| Al$_2$O$_3$ thermal | 250 | 25 | |
| HfO$_2$ plasma-assisted | 200 | 25 | |
| Ta$_2$O$_5$ thermal | 250 | 25 | |
| Al$_2$O$_3$/HfO$_2$ nl plasma-assisted | 200 | 100 | yes |
| Al$_2$O$_3$/Ta$_2$O$_5$ nl thermal | 250 | 100 | yes |

These ALD coating systems were applied to both laser glass and blue filter glass.

A high processing temperature of 100 to 350° C., preferably 200 to 350° C., and more preferably 250 to 300° C. during the coating process is considered to be favorable for a low degradation tendency of the ALD coating.

Some coating systems are designed as a nanolaminate. This means that the involved layers are made very thin, preferably between 2 and 10 nm, with alternating high refractive index and low refractive index materials.

An optical component according to the invention may additionally comprise further layers, preferably AR layers. It should be considered here, that ALD layers are under tensile stress and that standard electron beam or sputter coatings may exhibit lower layer adhesion on phosphate glasses than on silicate glasses, in particular quartz.

Strong tensile stresses in a higher layer may therefore delaminate or rupture underlying layers. Even small cracks are therefore undesirable in the context of the invention.

Even if such a sequence of layers of the coating system can be technically realized on the substrate as an optical material with a prior art AR layer applied thereon and furthermore the ALD coating system applied thereon, it is nevertheless advantageous to apply the ALD layer directly onto the substrate and the AR coating afterwards.

It is of course also possible to form the entire AR system of ALD layers so that there is no need to deposit further layers above or below the ALD layer stack using a different coating technology.

LIST OF REFERENCE NUMERALS

1 Optical component
10 Optical material
2 Coating comprising a layer comprising an inorganic material
21 High-index coating
22 Low-index coating
3 Encapsulation
31 Region with highly degrading conditions
32 Region with normal environmental conditions
41, 42, 43 Layer or layer system with optical effect
5 Substrate

What is claimed is:

1. An optical component, comprising:
an optical material, wherein the optical material has a native surface that is susceptible to degradation processes;
a first coating on the optical material comprising a first layer being produced by an atomic layer deposition (ALD) process and comprising an inorganic material, the first coating being substantially contiguous so that there are no continuous paths between an environment surrounding the optical component and the optical material;
a second coating that overlaps at least a portion of the first coating, wherein the at least the portion of the first coating is disposed under the second coating, and wherein the second coating comprises at least one layer produced by a physical vapor deposition (PVD) process; and
a degradation resistance after storage of at least 24 hours at a temperature of 85° C. and a relative humidity of 85% and/or after storage in deionized water for six months at a temperature of 25° C. selected from the group consisting of:
a functionality of the optical component that does not deviate by more than 5% from an initial value of the functionality;
a formation of no additional defects greater than 10 μm determined according to standard ISO 10110;
no detachment of the first coating from the optical material;
no strong change in color of the optical material as determined as a change in color coordinates in the CIE 1931 system;
no strong change in color of the first coating as determined as a change in color coordinates in the CIE 1931 system; and
any combinations thereof.

2. The optical component as claimed in claim 1, wherein the optical material comprises a material selected from the group consisting of an inorganic non-metallic material, an organic material, an amorphous inorganic non-metallic material, and glass.

3. The optical component as claimed in claim 1, wherein the optical material comprises a glass selected from the group consisting of: phosphate glass, phosphate glass including color-imparting components, phosphate glass including filtering components, phosphate glass including optically laser-active components, LG750 glass, LG760 glass, LG770 glass, APG1 glass, LG940 glass, LG950 glass, LG960 glass, S8612 glass, BG39 glass, BG50 glass, BG55 glass, BG56 glass, BG57 glass, BG60 glass, BG61 glass, and any combinations thereof.

4. The optical component as claimed in claim 1, wherein the optical material comprises a phosphate glass having a content of at least 10 wt % of $P_2O_5$ and a content of at most 80 wt % of $P_2O_5$.

5. The optical component as claimed in claim 1, wherein the optical material comprises a phosphate glass having a content of $P_2O_5$ from 50 wt % to 80 wt %.

6. The optical component as claimed in claim 1, wherein the first layer comprises a layer selected from the group consisting of: an inorganic oxidic layer; an inorganic amorphous oxidic layer; an $Al_2O_3$ oxide layer; an $SiO_2$ oxide layer; an $Nb_2O_5$ oxide layer; an $Ta_2O_5$ oxide layer; an $HfO_2$ oxide layer; an $Sc_2O_5$ oxide layer; a $TiO_2$ oxide layer; and any combinations thereof.

7. The optical component as claimed in claim 1, wherein the optical component comprises a multi-layer coating system comprising at least one layer of a high refractive index material and/or at least one layer of a low refractive index material.

8. The optical component as claimed in claim 7, wherein the multi-layer coating system comprises the at least one layer of the high refractive index material and the at least one layer of the low refractive index material, and wherein the at least one layer of the high refractive index material and the at least one layer of the low refractive index material are arranged alternately.

9. The optical component as claimed in claim 7, wherein the low refractive index material comprises SiO2 and wherein the high refractive index material comprises a material selected from the group consisting of: $Ta_2O_5$; $Al_2O_3$; $HfO_2$; $Nb_2O_5$; $TiO_2$; and $ZrO_2$.

10. The optical component as claimed in claim 1, wherein the first coating has a thickness of at least 1 nm and at most 10,000 nm or a thickness of at least 20 nm and at most 200 nm.

11. The optical component as claimed in claim 1, wherein the first coating covers at least part of a surface area of the optical component, wherein the surface area is configured for contact with a fluid reactive with the optical material.

12. The optical component as claimed in claim 1, wherein the first coating covers or encloses the optical material over an entire surface area thereof.

13. The optical component as claimed in claim 1, wherein the first coating covers one or more optical faces of the optical material.

14. The optical component as claimed in claim 1, wherein the first coating comprises a multi-layer system having consecutive layers of at least partially a different composition.

15. The optical component as claimed in claim 1, wherein the first coating and the second coating define an optically active layer system that reduces reflection or enhances reflection.

16. The optical component as claimed in claim 1, wherein the optical material has at least one face with a portion comprising a roughness determined as a root mean square roughness of not more than 8 nm, wherein the portion is at least partially provided with the coating.

17. The optical component as claimed in claim 1, wherein the optical material has at least one face with a portion comprising a roughness determined as a root mean square roughness of at least 0.5 μm.

* * * * *